No. 693,884. Patented Feb. 25, 1902.
E. NAGY.
ARTIFICIAL TOOTH CROWN AND PROCESS OF MAKING SAME.
(Application filed Jan. 16, 1901.)
(No Model.)
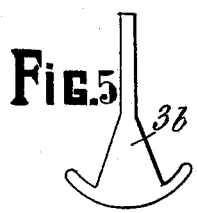
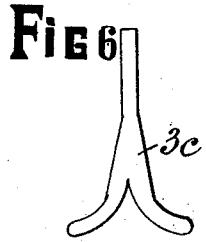
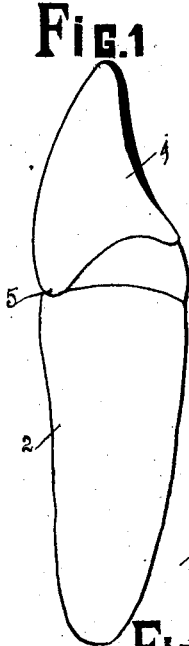
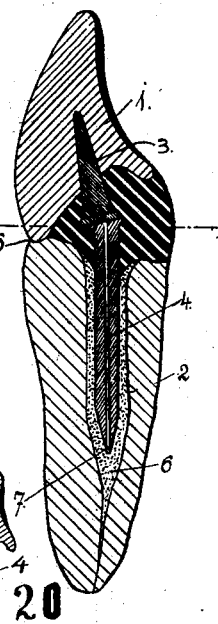
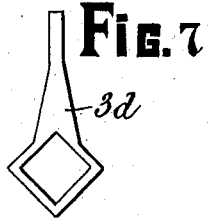
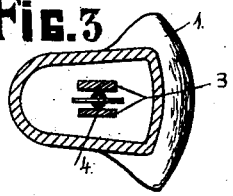
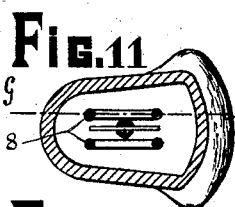
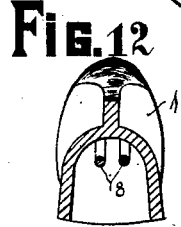
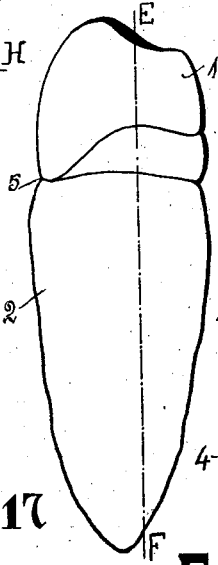
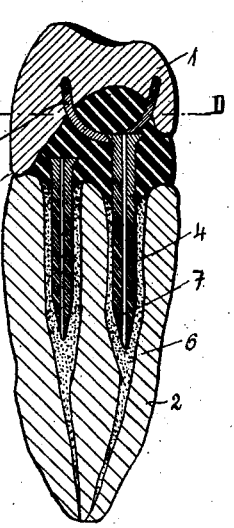
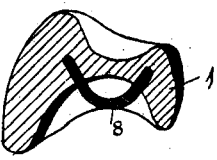
WITNESSES:
Fred White
Domingo A. Usina
INVENTOR:
Emil Nagy,
By his Attorneys
Arthur E. Chaser & Co.
THE NORRIS PETERS CO., PHOTO-LITHO., WASHINGTON, D. C.

UNITED STATES PATENT OFFICE.

EMIL NAGY, OF BUDAPEST, AUSTRIA-HUNGARY.

ARTIFICIAL TOOTH-CROWN AND PROCESS OF MAKING SAME.

SPECIFICATION forming part of Letters Patent No. 693,884, dated February 25, 1902.

Application filed January 16, 1901. Serial No. 43,449. (No model.)

*To all whom it may concern:*

Be it known that I, EMIL NAGY, a subject of the Emperor of Austria-Hungary, residing at IV. Városház utcza 12, Budapest, Austria-Hungary, have invented certain new and useful Improvements in Artificial Tooth-Crowns and Processes Employed in Making the Same, of which the following is a specification.

The object of this invention is to provide a novel artificial tooth-crown which possesses important advantages over former tooth-crowns.

In the pivot or pin-connected teeth at present in general use a pin is employed which is set into the crown either in the firing of the latter or by means of dentists' cement. In such cases the crown has to be ground accurately to fit the previously-prepared root, which is a most tedious operation. In the case of very deep roots an accurate fit is nearly impossible, in which case it is necessary to resort to some other equally tedious process. It is especially important to observe that in these former crowns the fitting of the pin in its proper position is usually most difficult, which is not the case with the crown of my invention.

The process of my invention besides being quite simple also results in a more accurately-fitting and durable crown.

In the accompanying drawings, illustrating embodiments of my invention, Figure 1 is a side view of a front lower tooth provided with my improved crown. Fig. 2 is a longitudinal section of Fig. 1. Fig. 3 is a cross-section on the line A B of Fig. 2. Figs. 4 to 8 illustrate various forms of cramps which may be employed in connection with my improved crown. Fig. 9 is a side view of a back tooth provided with a modified form of crown especially adapted for back teeth. Fig. 10 is a longitudinal section of Fig. 9. Fig. 11 is a cross-section on the line C D of Fig. 10. Fig. 12 is a cross-section on the line E F of Fig. 9. Fig. 13 is a section on the line G H of Fig. 11. Figs. 14 to 17 illustrate various forms of cramps. Figs. 18 and 19 illustrate a connecting-pin in elevation and cross-section, respectively; and Fig. 20 illustrates the improved crown connected with a hollow pin.

In practicing my improved process the crown is fitted to the exposed end of the root by molding on the preferably porcelain body of the crown a base made of any suitable material and whose lower face is molded to fit the end of the root. For the ordinary pin connection the pin is embedded in said base, preferably by casting the base about the pin, while the latter is held in such a position that it will enter the cavity of the root. The molding of the base is most conveniently effected by fitting the body of the crown at its front edge to the front edge of the root. The rear portion of the body is shorter than the front, so as to leave a space at the rear between the body and the root. The base is preferably secured strongly to the body of the crown by means of cramps inserted into the body in any convenient way and projecting therefrom, so as to engage the base when the latter is molded on the crown. In the preferred construction a pair of cramps is used, and the portion of the pin within the base lies between such cramps and is secured thereto by the material of the base. Also I preferably use a hollow pin having a flat head and cramps of different types for front and back teeth.

As indicated in the drawings, the preferred form of my new crown is longer at the front than at the rear. In the crown-body 1 and projecting from the under side thereof are two cramps 3, Figs. 2 and 3, on opposite sides of the center line. For the six front teeth the construction shown in Figs. 2 and 3 is preferred, using pairs of substantially T-shaped cramps 3 3$^a$ 3$^b$ 3$^c$ 3$^d$ 3$^e$ or the like made of any suitable material, such as platinum, and attached in any suitable way. With porcelain crowns the cramps are burned in—that is, inserted while the clay is soft, so that the firing of the clay fastens them in place permanently. The ends of the cramps are preferably embedded in the crown—that is, do not project through to the outer face of the crown. By this construction they are held very firmly and without longitudinal looseness in the crown. For the teeth which are farther back, as indicated in Figs. 10 to 13, the employment of the above-described cramps would weaken the crown, since the shanks of such cramps would have to be let into the crown at the point where the wall of the latter is weakest. To prevent this, I prefer to use pairs of cramps 8 8$^a$ 8$^b$ 8$^c$ 8$^d$ or the like, which project in the form of an arch or handle from the crown and are let into the stronger front and rear portions of the crown at the ends of said cramps. The upper end of the pin 4 is preferably flattened and projects between the two cramps, its other end lying in the direction to enter the cavity of the root, as shown in Figs. 2 and 10. It is preferred to make the pin 4 as a capillary tube with strong walls. The base of the crown, which forms the connecting material between the crown and the root, may consist of an easily-fusible metal, such as "lightning-cast" or the like, which is made to completely fill the free space between the crown and the root by a molding process, as hereinafter explained, which fits accurately the root as well as the crown and which at the same time provides a stiff connection between the cramps and the pin.

Obviously the cramps for the six front teeth need not be exactly T-shaped, but may be of any of the other forms shown in Figs. 4 to 8 or of any form similar to these and of any suitable cross-section. The cramps for the back teeth may likewise be of any suitable form and cross-section. Figs. 14 to 17 show modifications of the arched or handle-shaped design.

As above explained, there is employed with my improved tooth-crown a pin 4, Figs. 18 and 19, having a body of any desired shape in cross-section and preferably flattened at its upper end, which projects between the cramps, and sharpened or pointed at the end which is to project into the root. The surface of the pin is roughened, as by the grooves shown, in order to hold it more firmly in the cement. I prefer also to provide a passage 7 in the pin 4, which facilitates the removal of the pin in case of the breakage of a crown which has been set in position and hardened in the manner hereinafter described. By reason of the capillary passage a drill can be inserted very easily, and by the employment of a sufficiently strong drill the whole pin can be removed without difficulty. My improved hollow pin is thus a great improvement over the solid pins formerly in general use.

A detailed description of the preferred process of mounting my new tooth-crown is as follows: The tooth-root 2 is prepared in a sort of funnel shape, as shown most clearly in Figs. 2 and 10. A suitable crown-body for the same is then selected, and the thin front portion 5 thereof is ground to fit the root accurately. A pin 4 is now inserted into the cavity of the root in such a position that the head thereof will lie between the two cramps 3 or 8, Fig. 3 or Fig. 11, without altering the position of the crown-body on the front edge of the root. Some softened wax is now placed on the crown-body about the cramps and the pin, which, for the purpose of making a better connection, is coated on its flat ends with easily-fusible metal, such as lightning-cast or the like, and slightly warmed, is inserted between the cramps. The pointed end of the pin is then stuck into the hollow of the root, together with a quantity of wax, and the crown-body is brought accurately to its proper position and connection. There is thus obtained a full and true wax impression of the upper surface of the root. The crown-body, together with the wax and the pin, is then removed, care being taken not to distort the wax, and they are embedded in a soft plaster mold. The wax is then removed, as by means of hot water, and the mold dried and filled with lightning-cast or the like, which forms a base for the crown, as explained. After the cooling of the cast the mold is broken, the crown, consisting of the porcelain body, molded base, and projecting pin, is taken out, and the overflowed lightning-cast filed off, so as to obtain an accurate impression of the edge of the root. The crown is now ready for setting and is fastened to the root by means of a small quantity of cement 6.

The described tooth-crowns are easily mounted and require but little grinding. They are especially useful on account of the ease with which they may be joined to the root regardless of the direction of the hollow of the root. They are also easily fitted, even in the case of bad deep roots. Since they are made from an exact impression of the root, they fit accurately, whereby the pressure in use is equally distributed over the inside of the root and the springing of the same is prevented. Furthermore, very little cement or the like is used, whereby renewed ulceration of the root is prevented. The setting of my improved tooth-crown is as easy as possible, because being made from an accurate mold it naturally seeks its proper position on the root when it is set in place and the pin is already in position to enter the cavity of the root.

My improved tooth-crown is also capable of advantageous and labor-saving employment in bridgework and metal plates. In any case I may employ lightning-cast, caoutchouc, enamel, or any similar material as a binder.

In cases in which the natural cavity in the root does not run obliquely or crookedly the improved crown may be used as a complete article of manufacture in combination with the hollow pin above described, as a hollow-pin tooth, Fig. 20, the indirect burned connection of the pin to the crown by the intermediation of the molded base and the burned-in cramps being changed to a direct burned connection of the pin to the crown, the head of the pin being substituted for the cramp as a connecting member between the crown and the pin. The setting of the crown takes place in this case with the help of a wax mold and the use of a fusible metal base in the manner previously described.

Obviously any number of cramps, one or more, may be used, though I prefer a pair, for the reasons explained.

What I claim, and desire to secure by Letters Patent, are the following-defined novel features and combinations, each substantially as described:

1. The combination with an artificial tooth-crown body of a pair of cramps projecting from the under side thereof, and a pin having its head lying between said cramps and secured thereto.

2. An artificial tooth-crown comprising in combination a body, a base on said body molded to fit the exposed end of the root, and to bear equally thereon at all points, and a pin projecting from said base in a direction to enter the cavity of the root.

3. The combination with an artificial tooth-crown body of a base on said body molded to fit the exposed end of the root, cramps projecting from said body into said base and a pin projecting from said base in a direction to enter the cavity of the root, the head of said pin lying between two of the said cramps and being secured thereto by said molded base.

4. In mounting tooth-crowns, the process which consists in fitting the body of the crown to the front edge of the root, leaving a space at the rear between said body and root, inserting a pair of cramps in said body, molding a base on said body to fit the rear portion of the exposed end of the root, and embedding a pin in said cast base in a direction to enter the cavity of the root.

5. In mounting tooth-crowns, the process which consists in molding a base on the body of the crown to fit the exposed end of the root, and embedding a pin in said base in a direction to enter the cavity of the root.

6. In mounting tooth-crowns, the process which consists in fitting the body of the crown to the front edge of the root, leaving a space at the rear between said body and root, and molding a base on said body to fit the rear portion of the exposed end of the root.

7. In mounting tooth-crowns, the process which consists in inserting a pair of cramps in the body of the crown, molding a base on said body to fit the exposed end of the root, and embedding a pin in said cast base in a direction to enter the cavity of the root.

In witness whereof I have hereunto signed my name in the presence of two subscribing witnesses.

EMIL NAGY.

Witnesses:
BERNAUER ZIGMOND,
FRANK DYER CHESTER.